United States Patent
Bessho et al.

(10) Patent No.: US 9,649,921 B2
(45) Date of Patent: May 16, 2017

(54) RUN CHANNEL (71) Applicants: TOKAI KOGYO CO., LTD., Obu-shi, Aichi (JP); HONDA MOTOR CO., LTD., Tokyo (JP)

(72) Inventors: Eiichi Bessho, Obu (JP); Yohei Inai, Wako (JP); Katsuyoshi Sugawara, Wako (JP)

(73) Assignees: TOKAI KOGYO CO., LTD., Obu (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/916,249

(22) PCT Filed: Aug. 20, 2014

(86) PCT No.: PCT/JP2014/071814
§ 371 (c)(1),
(2) Date: Mar. 3, 2016

(87) PCT Pub. No.: WO2015/033782
PCT Pub. Date: Mar. 12, 2015

(65) Prior Publication Data
US 2016/0214471 A1    Jul. 28, 2016

(30) Foreign Application Priority Data
Sep. 3, 2013    (JP) .................................. 2013-181818

(51) Int. Cl.
*B60J 10/02*    (2006.01)
*B60J 10/76*    (2016.01)
(Continued)

(52) U.S. Cl.
CPC .............. *B60J 10/76* (2016.02); *B60J 5/0402* (2013.01); *B60J 5/0419* (2013.01); *B60J 10/21* (2016.02); *E05D 15/165* (2013.01)

(58) Field of Classification Search
CPC . B60J 10/21; B60J 10/76; B60J 5/0402; B60J 5/0419
(Continued)

(56) References Cited

U.S. PATENT DOCUMENTS 5,158,335 A    10/1992 Usuta et al.
5,256,361 A *  10/1993 Keys ....................... B29C 65/70
                                                          156/221
(Continued)

FOREIGN PATENT DOCUMENTS

CN    1840846 A    10/2006
JP    H03-200421 A    9/1991
(Continued)

OTHER PUBLICATIONS

Sep. 22, 2014 Search Report issued in International Patent Application No. PCT/JP2014/071814.
(Continued)

*Primary Examiner* — Justin Rephann
(74) *Attorney, Agent, or Firm* — Oliff PLC (57) ABSTRACT An interior side wall part of a rear die-molded corner part of a run channel is provided with a plate-shaped protrusion abutting on an interior seal lip at the time of upward and downward movement of a window pane, the protrusion extending in a direction from a base end side toward a distal end side of the interior side wall part along a wall surface of the interior side wall part. Accordingly, a force by which the interior seal lip presses the window pane to a vehicle exterior can be increased to increase a seal pressure. Also, the protrusion is formed so as to protrude obliquely from the wall surface of the interior side wall part.

10 Claims, 11 Drawing Sheets (51) Int. Cl.
*B60J 10/21* (2016.01)
*B60J 5/04* (2006.01)
*E05D 15/16* (2006.01)

(58) Field of Classification Search
USPC ........................................................ 49/479.1
See application file for complete search history.

(56) References Cited

U.S. PATENT DOCUMENTS

| | | | |
|---|---|---|---|
| 5,566,510 A * | 10/1996 | Hollingshead | B29C 45/14409 49/475.1 |
| 5,635,274 A * | 6/1997 | Chihara | B60J 10/15 428/122 |
| 5,636,895 A * | 6/1997 | Ito | B60J 10/80 296/146.9 |
| 5,976,438 A * | 11/1999 | Hamabata | B29C 45/14409 264/138 |
| 6,240,677 B1 * | 6/2001 | Baumann | B60J 10/79 49/479.1 |
| 6,412,226 B1 | 7/2002 | Nozaki et al. | |
| 6,996,936 B1 * | 2/2006 | Maass | B60J 10/74 49/440 |
| 2002/0139054 A1 * | 10/2002 | Schlachter | B60J 10/88 49/479.1 |
| 2005/0028448 A1 * | 2/2005 | Mizutani | B60J 10/24 49/479.1 |
| 2005/0198906 A1 * | 9/2005 | Fujita | B60J 10/76 49/428 |
| 2006/0218865 A1 * | 10/2006 | Tamaoki | B60J 10/246 49/415 |
| 2006/0248802 A1 | 11/2006 | Tamaoki et al. | |
| 2009/0039672 A1 * | 2/2009 | Kubo | B29C 45/14 296/146.2 |
| 2009/0071077 A1 * | 3/2009 | Takase | B60J 10/277 49/489.1 |
| 2009/0108625 A1 * | 4/2009 | Minami | B60J 10/277 296/146.2 |
| 2010/0077670 A1 * | 4/2010 | Jimenez | B60J 10/88 49/479.1 |
| 2011/0099912 A1 * | 5/2011 | Ohtake | B60J 5/0402 49/502 |
| 2012/0079772 A1 * | 4/2012 | Mine | B60J 10/76 49/490.1 |
| 2013/0111821 A1 * | 5/2013 | Suzuki | B60J 10/78 49/483.1 |
| 2015/0082709 A1 * | 3/2015 | Dosaki | B60J 10/76 49/490.1 |
| 2015/0273990 A1 * | 10/2015 | Adachi | B60J 1/17 49/459 |
| 2016/0089962 A1 * | 3/2016 | Kuroki | B60J 10/30 49/442 |

FOREIGN PATENT DOCUMENTS

| | | |
|---|---|---|
| JP | H06-156077 A | 6/1994 |
| JP | H09-263137 A | 10/1997 |
| JP | 2000-280755 A | 10/2000 |
| JP | 2007-308044 A | 11/2007 |
| JP | 2008-024111 A | 2/2008 |
| JP | 2009-227243 A | 10/2009 |
| JP | 2010-179772 A | 8/2010 |

OTHER PUBLICATIONS

Sep. 22, 2014 Written Opinion issued in International Patent Application No. PCT/JP2014/071814.
Dec. 27, 2016 Office Action issued in Japanese Patent Application No. 2015-535416.
Mar. 2, 2017 Office Action issued in Chinese Patent Application No. 201480048723.7.

* cited by examiner

SECTIONAL VIEW TAKEN ALONG LINE E'-E'

RUN CHANNEL

TECHNICAL FIELD

The present invention relates to a long run channel made of an elastic polymer material, attached along a window frame of a vehicle and guiding upward and downward movement of a window pane.

BACKGROUND ART

Generally, in a run channel attached along a window frame of a vehicle, extrusion-molded parts attached to an upper part and a longitudinal part of a window pane are respectively formed by extrusion molding, and a die-molded corner part attached to a corner part of the window frame between a distal end of the extrusion-molded part attached to the upper part and a distal end of the extrusion-molded part attached to the longitudinal part is formed by die molding such as injection molding or compression molding. Thereby, the distal end of the extrusion-molded part attached to the upper part and the distal end of the extrusion-molded part attached to the longitudinal part are connected through the die-molded corner part.

In each of the extrusion-molded part and the die-molded corner part of the run channel, a base bottom part facing an end face of the window pane, interior and exterior side wall parts respectively erected from both ends of the base bottom part in a width direction, and interior and exterior seal lips respectively extending from distal ends of the interior and exterior side wall parts toward the base bottom part are integrally formed. When the window pane is upwardly moved and an opening of the window is closed, the seal lips abut on the window pane and a gap between the window frame and the window pane is sealed to thereby prevent sound, water, etc. from leaking from the gap between the window frame and the window pane to the vehicle interior.

When such a run channel is configured to firmly press the window pane to the exterior side wall part or the exterior seal lip, it is possible to improve sealability against sound or water from the vehicle exterior becoming a cause of a sound leak or a water leak.

Hence, there is a technique for making a wall thickness of the interior seal lip thicker than that of the exterior seal lip of the run channel. Further, there is a technique for providing the distal end of the interior seal lip with a return lip so as to extend along a longitudinal direction (that is, an extrusion direction) of the extrusion-molded part or providing the interior side wall part with a reinforcing lip so as to extend along the longitudinal direction of the extrusion-molded part in the extrusion-molded part of the run channel to increase a force by which the interior seal lip presses the window pane to the vehicle exterior side by the return lip or the reinforcing lip.

Also, as technique for reinforcing the die-molded corner part of the run channel, there is a technique of providing the side wall part of the die-molded corner part with a reinforcing rib extending in a direction capable of being die-molded as described in Patent Reference 1 (JP-A-H09-263137) or Patent Reference 2 (JP-A-2010-179772).

PRIOR ART REFERENCE

Patent Reference

Patent Reference 1: JP-A-H09-263137
Patent Reference 2: JP-A-2010-179772

DISCLOSURE OF THE INVENTION

Problems that the Invention is to Solve

As described above, in the extrusion-molded part of the run channel, the technique for providing the distal end of the interior seal lip with the return lip so as to extend along the longitudinal direction of the extrusion-molded part or providing the interior side wall part with the reinforcing lip so as to extend along the longitudinal direction of the extrusion-molded part can be implemented in the extrusion-molded part formed by extrusion molding. However, in the die-molded corner part formed by die molding such as injection molding or compression molding, the return lip or the reinforcing lip cannot be formed since it is formed in an undercut shape difficult to be taken out of a molding die. As a result, the die-molded corner part cannot firmly press the window pane to the vehicle exterior side as compared with the extrusion-molded part, and has a problem that a sound leak or a water leak tends to occur.

Also, using the techniques of Patent References 1 and 2 described above, it is considered to provide the interior side wall part of the die-molded corner part of the run channel with the reinforcing rib extending in the direction capable of being die-molded so as to abut on the interior seal lip and increase the force by which the interior seal lip presses the window pane to the vehicle exterior side by this reinforcing rib. However, like a conventional general reinforcing rib, in a case of configuring the reinforcing rib to perpendicularly protrude from a wall surface of the interior side wall part, for the reinforcing rib with a large thickness dimension, even when the reinforcing rib abuts on the seal lip, the reinforcing rib does not bend too much, the force by which the seal lip presses the window pane becomes too strong, and a pressure (hereinafter simply called a "seal pressure") acting between the seal lip and the window pane may become too high. Therefore, there is a fear that the window pane cannot be moved upwardly and downwardly smoothly. On the other hand, for the reinforcing rib with a small thickness dimension, when the reinforcing rib abuts on the seal lip, the reinforcing rib bends more easily, but at that time, a direction in which the reinforcing rib bends (lies down) becomes random, and the seal pressure becomes unstable. Therefore, sealability cannot be improved sufficiently.

Hence, a problem that the invention is to solve is to provide a run channel capable of improving sealability by appropriately increasing a seal pressure in a die-molded corner part of the run channel.

Means for Solving the Problems

In order to solve the problem described above, the invention provides a long run channel made of an elastic polymer material, capable of being attached along a window frame of a vehicle, and guiding upward and downward movement of a window pane by being attached along the window frame, the run channel comprising: extrusion-molded parts formed by extrusion molding and attached to an upper part and a longitudinal part of the window frame; and a die-molded corner part formed by die molding and attached to a corner part of the window frame so as to connect the extrusion-molded part attached to the upper part and the extrusion-molded part attached to the longitudinal part, wherein the die-molded corner part is formed in a substantially U-shape by a base bottom part facing an end face of the window pane at the time of being attached to the window frame and interior and exterior side wall parts respectively, in a transverse cross section of the run channel in a longitudinal direction thereof, erected from both ends of the base bottom part in a width direction, and the die-molded corner part includes interior and exterior seal lips respectively extending from distal ends of the interior and exterior side wall parts toward the base bottom part and an inside of the U-shape, and wherein the interior side wall part is provided with a plate-shaped protrusion abutting on the interior seal lip at the time of the upward and downward movement of the window pane, the protrusion extending in a direction from a base end side toward a distal end side of the interior side wall part along the wall surface of the interior side wall part and obliquely protruding from the wall surface of the interior side wall part toward the interior seal lip to form an acute angle with respect to the wall surface of the interior side wall part.

In this configuration, in the die-molded corner part of the run channel, the plate-shaped protrusion formed on the interior side wall part abuts on the interior seal lip, and thereby, a force by which the interior seal lip presses the window pane to the vehicle exterior can be increased to increase a seal pressure. Moreover, since the plate-shaped protrusion is formed so as to obliquely protrude from the wall surface of the interior side wall part, when the protrusion abuts on the interior seal lip, the protrusion bends more easily, and the force by which the seal lip presses the window pane is prevented from becoming too strong. Thereby, the seal pressure can be increased appropriately. Further, since the protrusion protrudes obliquely, the protrusion can be configured to bend (lie down) always in a constant direction, and the seal pressure can be stabilized. Accordingly, in the die-molded corner part of the run channel, sealability can be improved by increasing the seal pressure within a range in which the window pane can be moved upwardly and downwardly smoothly.

In this case, it is preferable that the protrusion is inclined towards a base bottom part side. By this configuration, since the protrusion bends more easily to the side of the base bottom part side, which is an insertion direction of the window pane, a bending direction of the protrusion does not become unstable, and thus, the seal pressure is stabilized.

Further, in an upper part of the die-molded corner part, it is preferable that the protrusion is formed so as to form an acute angle with respect to a direction of the upward and downward movement of the window pane. By this configuration, since the protrusion lies down more easily, the bending direction of the protrusion does not become unstable, and thus, the seal pressure is stabilized.

Since a water leak tends to occur in a place of a low seal pressure, the run channel could be configured so that a pressure (seal pressure) acting between the interior seal lip and the window pane becomes equal between the extrusion-molded part and the die-molded corner part connected to the extrusion-molded part as described in claim 4. By this configuration, even when the extrusion-molded part of the run channel is configured so as to make the seal pressure high by providing the distal end of the interior seal lip with a return lip (or providing the interior side wall part with a reinforcing lip), the seal pressure can be made equal between the extrusion-molded part and the die-molded corner part, and thus, the water leak can be prevented from tending to occur in the die-molded corner part.

Generally, in the run channel, a higher waterproof performance is required at the extrusion-molded part attached to the upper part of the window frame than at the extrusion-molded part attached to the longitudinal part of the window frame, and thus, there are cases where the seal pressure of the extrusion-molded part attached to the upper part is set to be higher than the seal pressure of the extrusion-molded part attached to the longitudinal part.

In consideration of such circumstances, it is preferable to make a pressure acting between the interior seal lip and the window pane in a portion of the die-molded corner part attached to an upper part side of the window frame (hereinafter simply referred to as an "upper part side of the die-molded corner part") to be higher than a pressure acting between the interior seal lip and the window pane in a portion of the die-molded corner part attached to a longitudinal part side of the window frame (hereinafter simply referred to as a "longitudinal part side of the die-molded corner part"). By this configuration, also in the die-molded corner part of the run channel, the seal pressure of the upper part side of the die-molded corner part can be made higher than the seal pressure of the longitudinal part side of the die-molded corner part to enhance waterproof performance of the upper part side of the die-molded corner part.

In this case, the protrusions may be respectively formed on the upper part side of the die-molded corner part and the longitudinal part side of the die-molded corner part, and a volume or thickness dimension of the protrusion formed on the upper part side of the die-molded corner part may be larger than that of the protrusion formed on the longitudinal part side of the die-molded corner part. By this configuration, the seal pressure of the upper part side of the die-molded corner part can be made higher than the seal pressure of the longitudinal part side of the die-molded corner part.

Further, a plurality of protrusions may be respectively formed on the upper part side of the die-molded corner part and the longitudinal part side of the die-molded corner part, and a distance between the plurality of protrusions formed on the upper part side of the die-molded corner part may be shorter than a distance between the plurality of protrusions formed on the longitudinal part side of the die-molded corner part. Also, by this configuration, the seal pressure of the upper part side of the die-molded corner part can be made higher than the seal pressure of the longitudinal part side of the die-molded corner part.

Alternatively, among the upper part side of the die-molded corner part and the longitudinal part side of the die-molded corner part, the protrusion may be formed on only the upper part side of the die-molded corner part. Also, by this configuration, the seal pressure of the upper part side of the die-molded corner part can be made higher than the seal pressure of the longitudinal part side of the die-molded corner part.

Incidentally, when a corner of the distal end of the protrusion makes line contact with the seal lip, there is a case where the corner of the distal end of the protrusion bites into the seal lip and the protrusion bends irregularly, and in such a case, there is a possibility that the seal pressure varies irregularly and a predetermined seal pressure cannot be ensured.

Accordingly, it is preferable that a corner of a distal end of the protrusion is chamfered. By this configuration, the protrusion can be brought into surface contact with the interior seal lip, and the protrusion can be prevented from bending irregularly. Accordingly, the seal pressure can be stabilized to ensure a predetermined seal pressure.

BRIEF DESCRIPTION OF THE DRAWINGS

FIG. 3(a) is a view showing a state where the window is opened, and FIG. 3(b) is a view showing a state where the window is closed.

FIG. 5(a) is a view showing a state where the window is opened, and FIG. 5(b) is a view showing a state where the window is closed.

FIG. 6(a) is a view showing a state where the window is opened, and FIG. 6(b) is a view showing a state where the window is closed.

FIG. 7(a) is a view showing a state where the window is opened, and FIG. 7(b) is a view showing a state where the window is closed.

FIG. 10(a) is a view showing a state where the window is opened, and FIG. 10(b) is a view showing a state where the window is closed.

MODE FOR CARRYING OUT THE INVENTION

One embodiment embodying a mode for carrying out the invention will hereinafter be described.

First, a schematic configuration of a door 11 of a front side of a vehicle will be described based on FIG. 1. An upper part of the door 11 is provided with a window frame 12, and a long run channel 13 (see FIG. 2) made of an elastic polymer material is attached to this window frame 12 along the inner peripheral side of the window frame 12. The run channel 13 is configured to guide upward and downward movement (slide movement) of a window pane 14 (window glass).

Next, a configuration of the run channel 13 will be described based on FIGS. 1 to 8.

Figure 1:
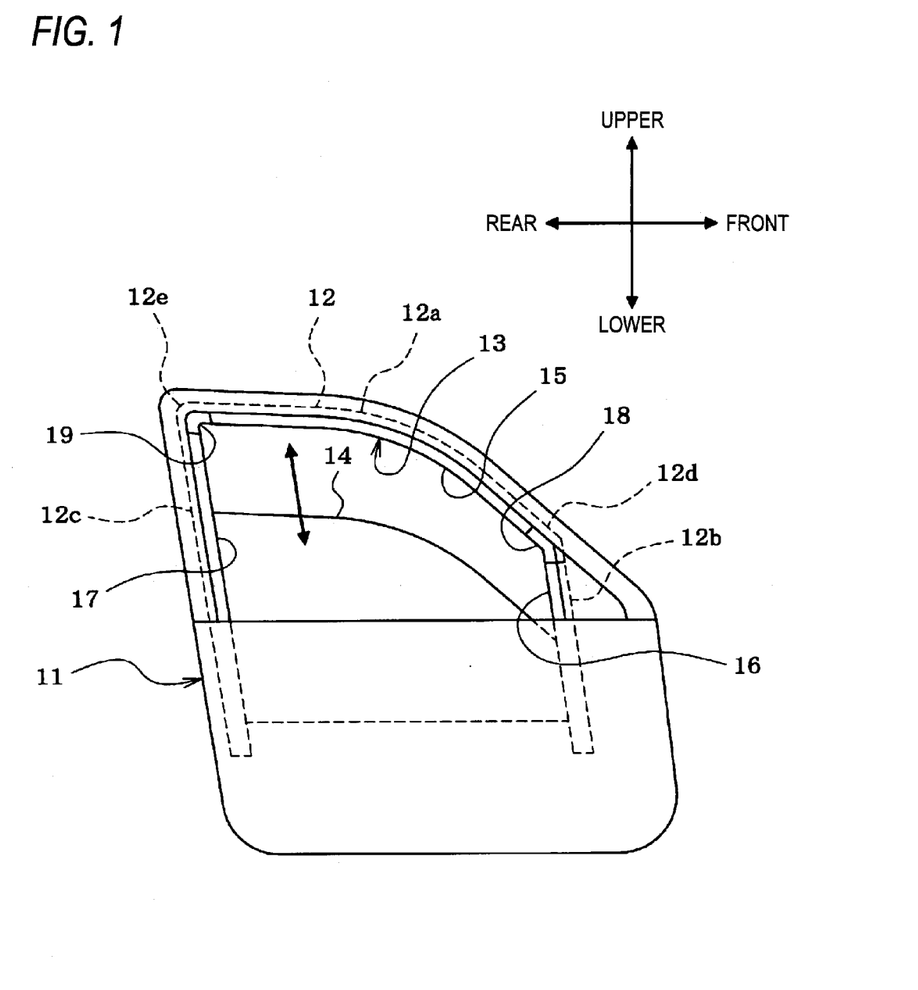
FIG. 1 is a schematic configuration diagram of a door of a vehicle in one embodiment of the invention.
Figure 2:
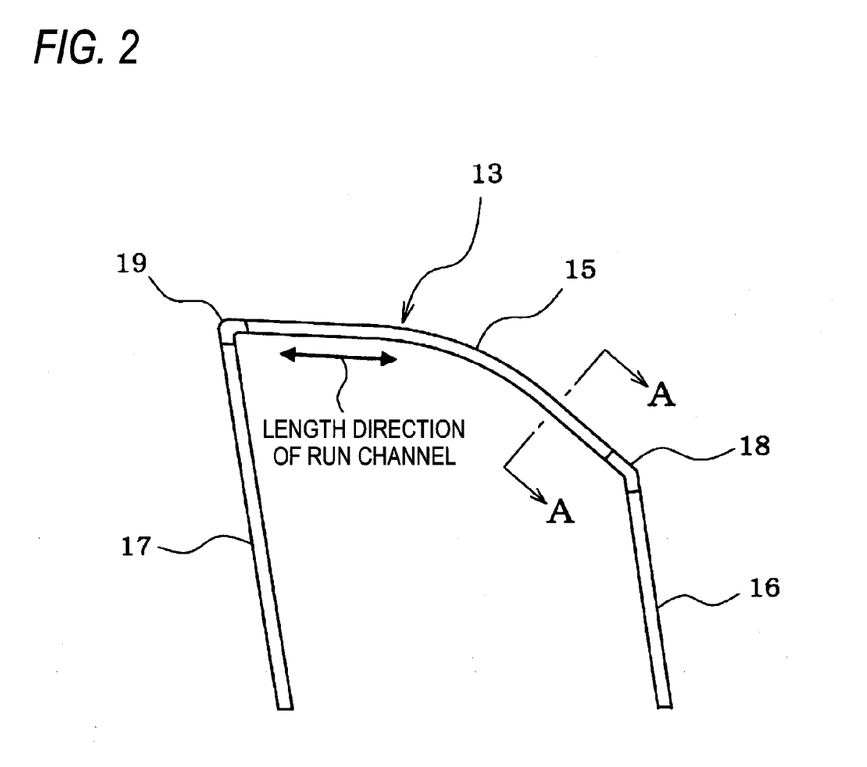
FIG. 2 is a front view of a run channel.

As shown in FIGS. 1 and 2, the run channel 13 includes an upper extrusion-molded part 15 attached to an upper part 12a of the window frame 12, a front extrusion-molded part 16 attached to a front longitudinal part 12b of the window frame 12, a rear extrusion-molded part 17 attached to a rear longitudinal part 12c of the window frame 12, a front die-molded corner part 18 which connects the upper extrusion-molded part 15 and the front extrusion-molded part 16 and is attached to a front side corner part 12d of the window frame 12, and a rear die-molded corner part 19 which connects the upper extrusion-molded part 15 and the rear extrusion-molded part 17 and is attached to a rear side corner part 12e of the window frame 12.

The run channel 13 (extrusion-molded parts 15 to 17 and die-molded corner parts 18, 19) is formed of an elastic polymer material such as TPE (thermoplastic elastomer) or rubber. In the present embodiment, as the elastic polymer material forming the run channel 13, for example, TPO (thermoplastic olefin elastomer) with a hardness of A70 is used.

The extrusion-molded parts 15 to 17 are formed in linear shapes at least at the time of molding by extrusion molding. Also, the die-molded corner parts 18, 19 are formed in shapes bent corresponding to shapes of the corner parts 12d, 12e by die molding such as injection molding or compression molding.

In the run channel 13, in a state in which a distal end of the upper extrusion-molded part 15 and a distal end of the front extrusion-molded part 16 are intersected at a predetermined angle and are set in a molding die of the front die-molded corner part 18, the inside of the molding die is filled with an elastic polymer material and the front die-molded corner part 18 is molded to thereby bond the upper extrusion-molded part 15 to the front extrusion-molded part 16 through the front die-molded corner part 18. Also, in a state in which a distal end of the upper extrusion-molded part 15 and a distal end of the rear extrusion-molded part 17 are set in a molding die of the rear die-molded corner part 19 at a predetermined angle, the inside of the molding die is filled with an elastic polymer material and the rear die-molded corner part 19 is molded to thereby bond the upper extrusion-molded part 15 to the rear extrusion-molded part 17 through the rear die-molded corner part 19.

Figure 3:
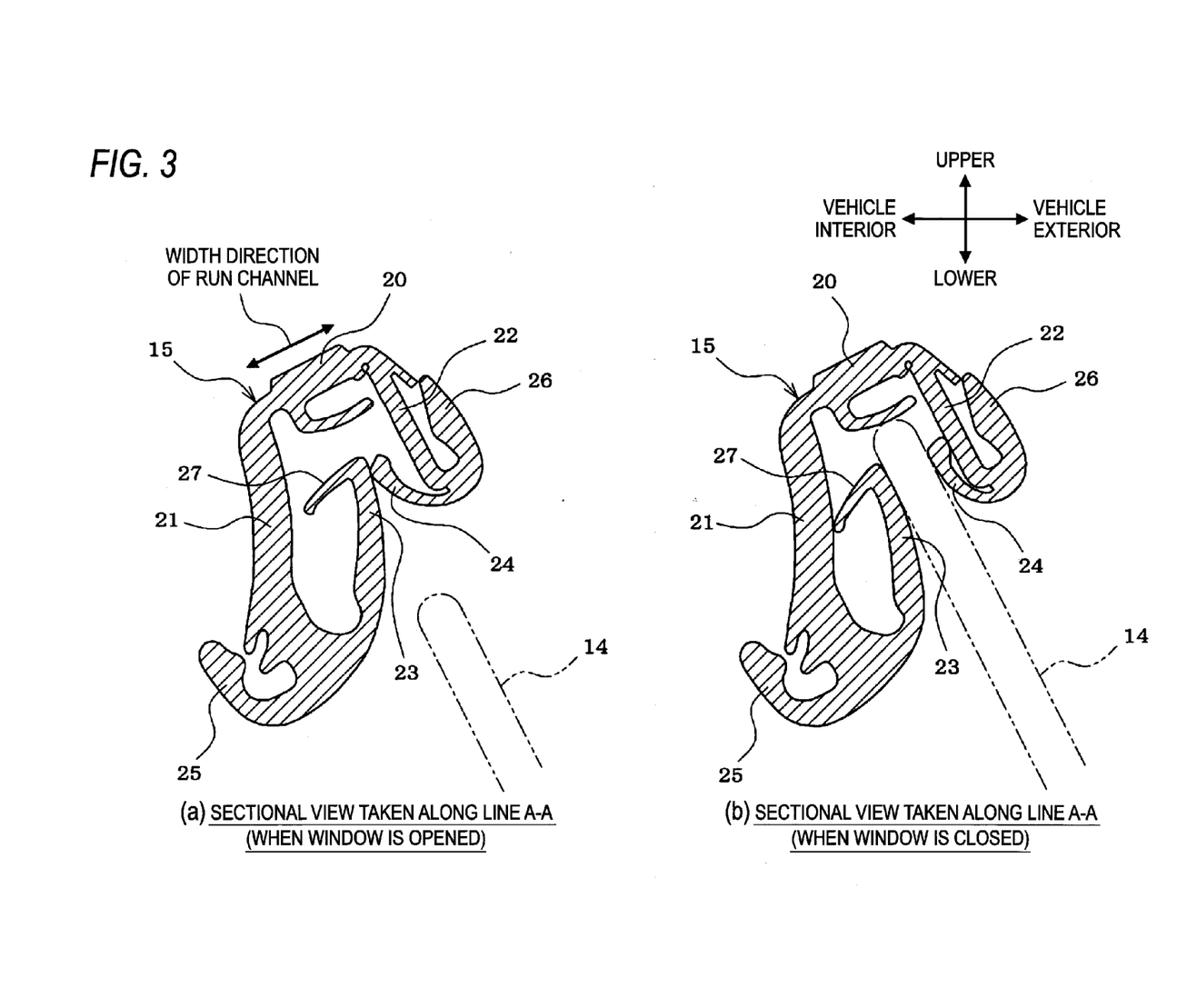
FIG. 3 is a sectional view taken along line A-A of FIG. 2.

As shown in FIG. 3, the upper extrusion-molded part 15 is formed in a substantially U-shape by a base bottom part 20 facing an end face of the window pane 14 and an interior side wall part 21 and an exterior side wall part 22 respectively, in a transverse cross section of the run channel 13 in a longitudinal direction thereof, erected from both ends of the base bottom part 20 in a width direction. By die molding of the elastic polymer material, the base bottom part 20, the interior and exterior side wall parts 21, 22, an interior seal lip 23 and an exterior seal lip 24 respectively extending from distal ends of the side wall parts 21, 22 toward the base bottom part 20 and the inside of the U-shape, an interior shield lip 25 and an exterior shield lip 26 respectively protruding from the distal ends of the side wall parts 21, 22 toward the sides opposite to the seal lips 23, 24, a return lip 27 extending from the distal end of the interior seal lip 23 toward the interior side wall part 21, and the like, are integrally molded. The interior seal lip 23 is formed in a shape thicker than that of the exterior seal lip 24 in order to press the window pane 14 to the vehicle exterior. Here, since main parts of the front extrusion-molded part 16 and the rear extrusion-molded part 17 are substantially the same as the upper extrusion-molded part 15, explanation of configurations of the front extrusion-molded part 16 and the rear extrusion-molded part 17 is omitted.

When the run channel 13 is attached to the window frame 12, the interior seal lip 23 and the exterior seal lip 24 in each of the extrusion-molded parts 15 to 17 respectively abut on a surface of the window pane 14 and seal a gap between the window frame 12 and the window pane 14 to thereby prevent sound, water, etc. from leaking from the gap between the window frame 12 and the window pane 14 to the vehicle interior.

As shown in FIG. 3(a), when the window is opened (or the window pane 14 is not positioned between the seal lips 23, 24), the return lip 27 does not abut on the interior side wall part 21. As shown in FIG. 3(b), the window pane 14 is moved upwardly and abuts on the interior and exterior seal lips 23, 24 and finally abuts on the base bottom part 20 to thereby close an opening of the window.

In a state in which the interior and exterior seal lips 23, 24 abut on the surface of the window pane 14, the distal end of the return lip 27 abuts on the interior side wall part 21, and the interior seal lip 23 becomes pressed to the vehicle exterior by the return lip 27. Accordingly, a force by which the interior seal lip 23 presses the window pane 14 to the vehicle exterior can be increased to firmly press the window pane 14 to the exterior seal lip 24, and sealability against sound or water from the vehicle exterior can be improved.

Figure 5:
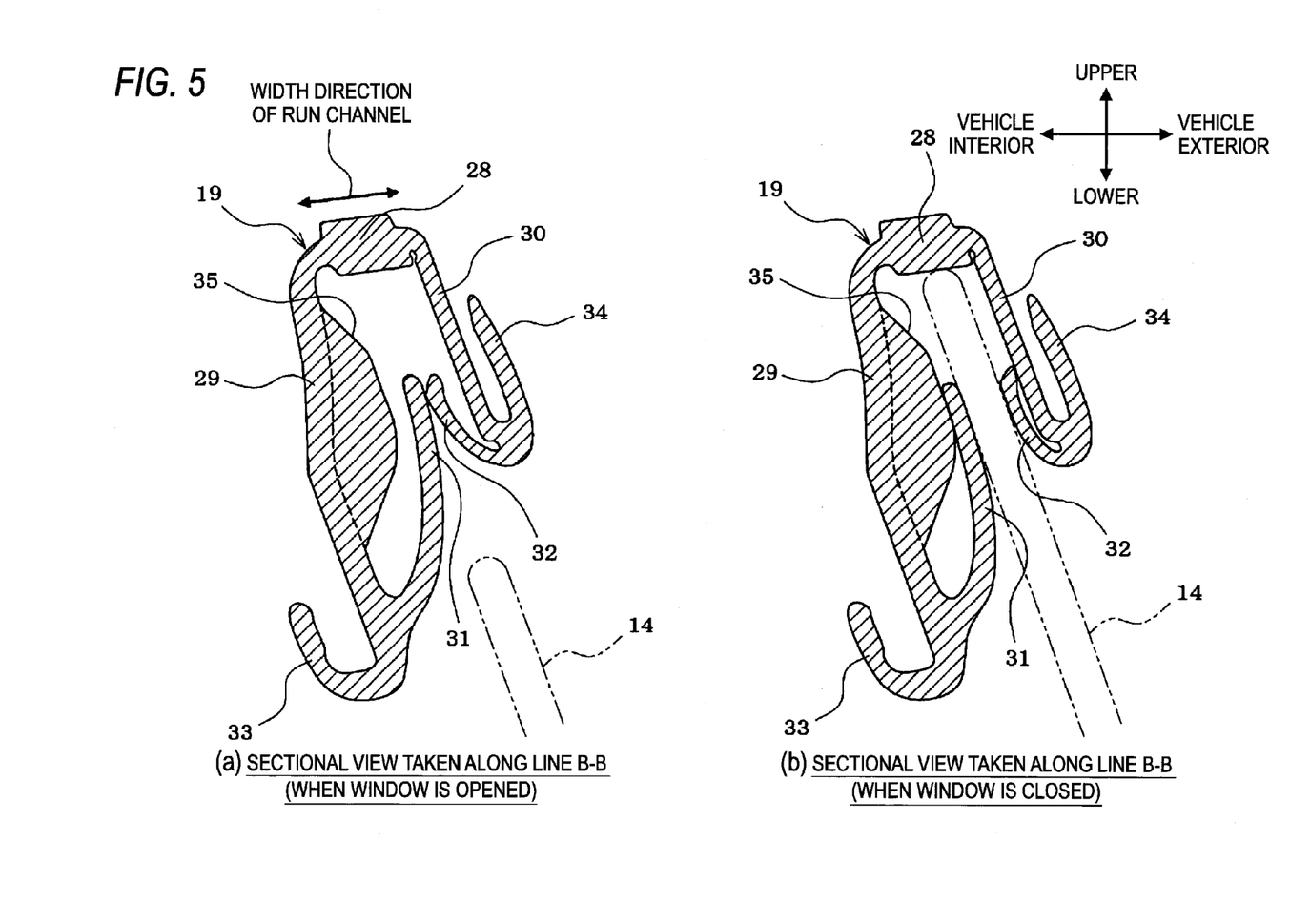
FIG. 5 is a sectional view taken along line B-B of FIG. 4.
Figure 6:
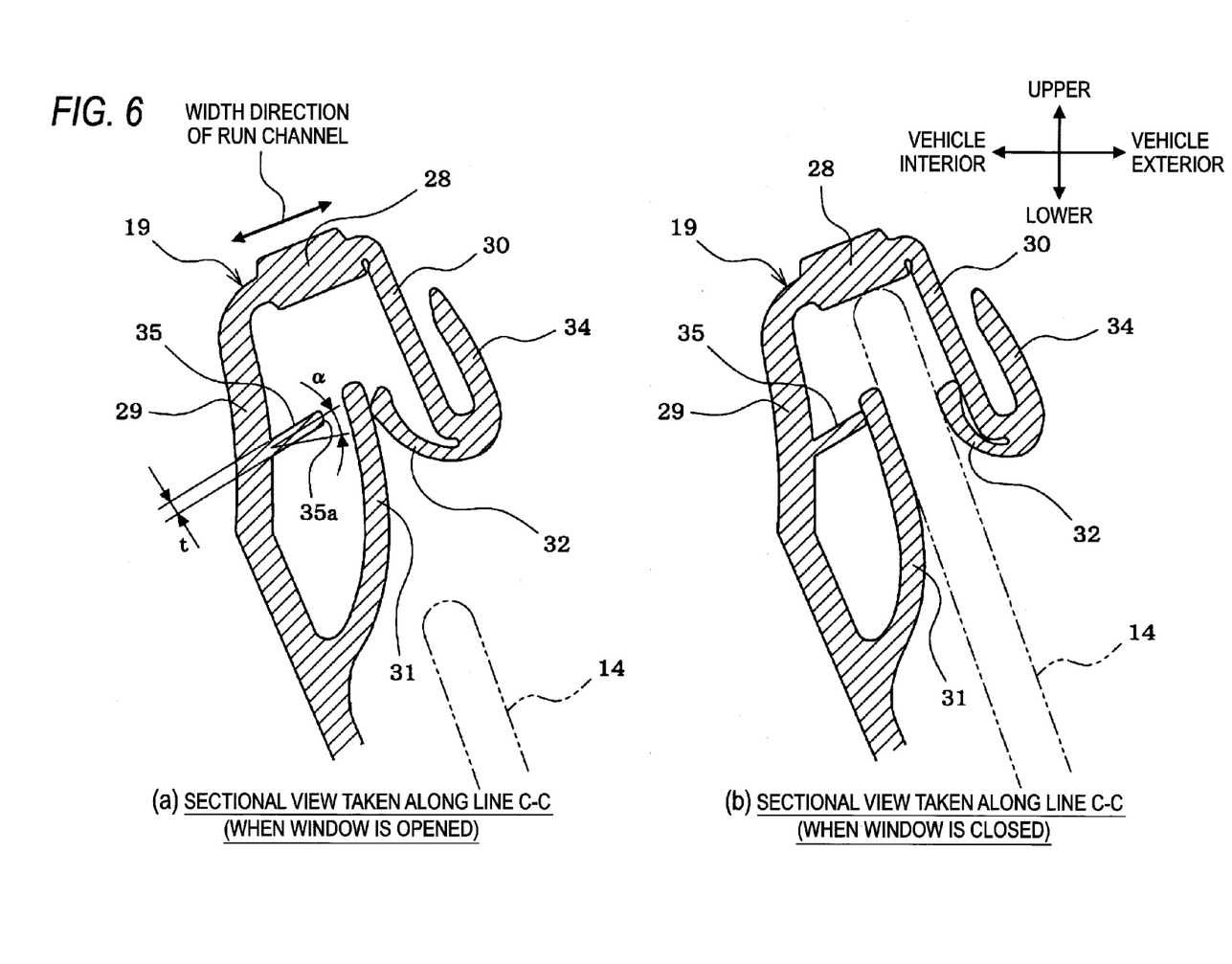
FIG. 6 is a sectional view taken along line C-C of FIG. 4.
Figure 7:
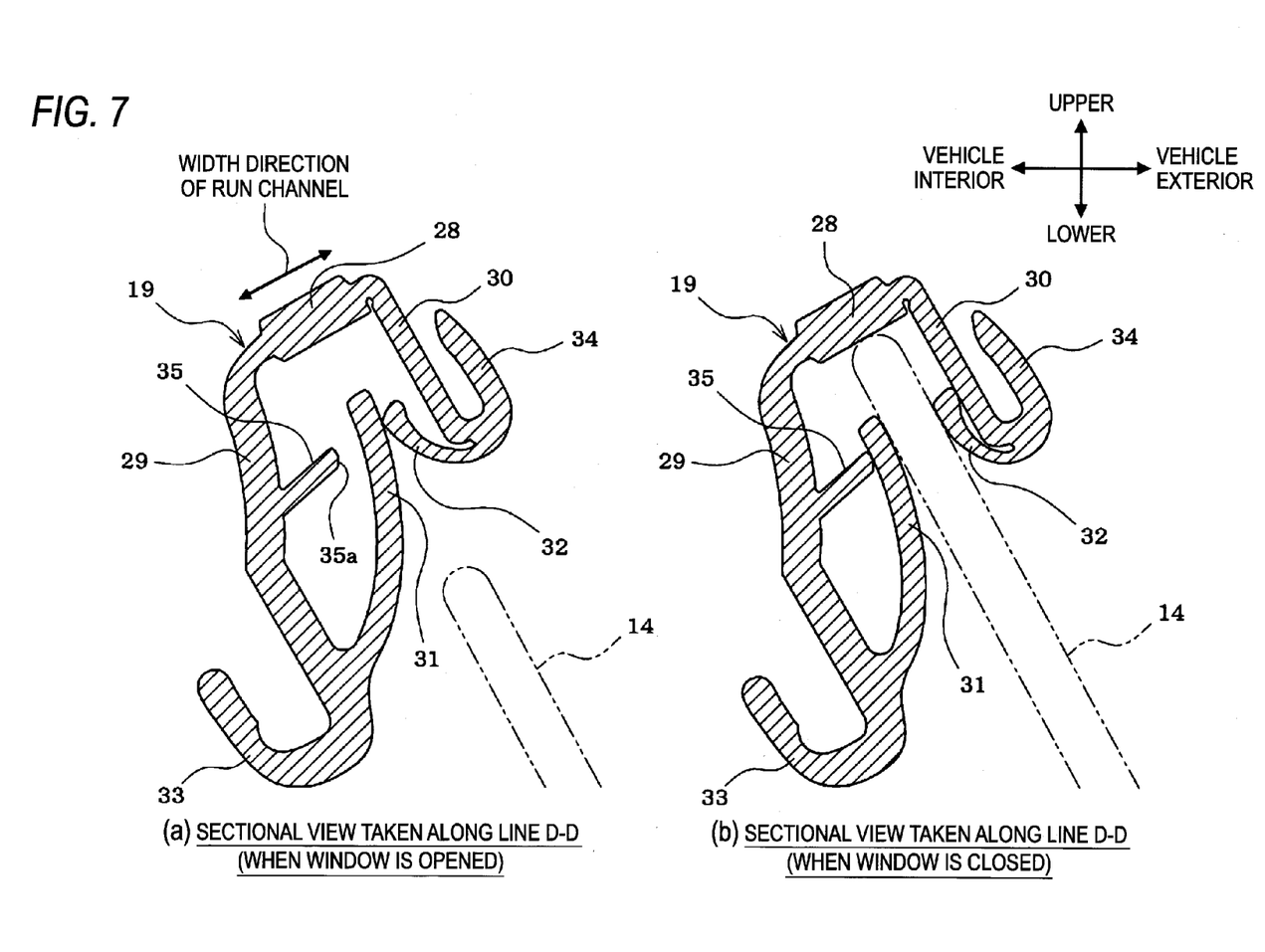
FIG. 7 is a sectional view taken along line D-D of FIG. 4.
Figure 8:
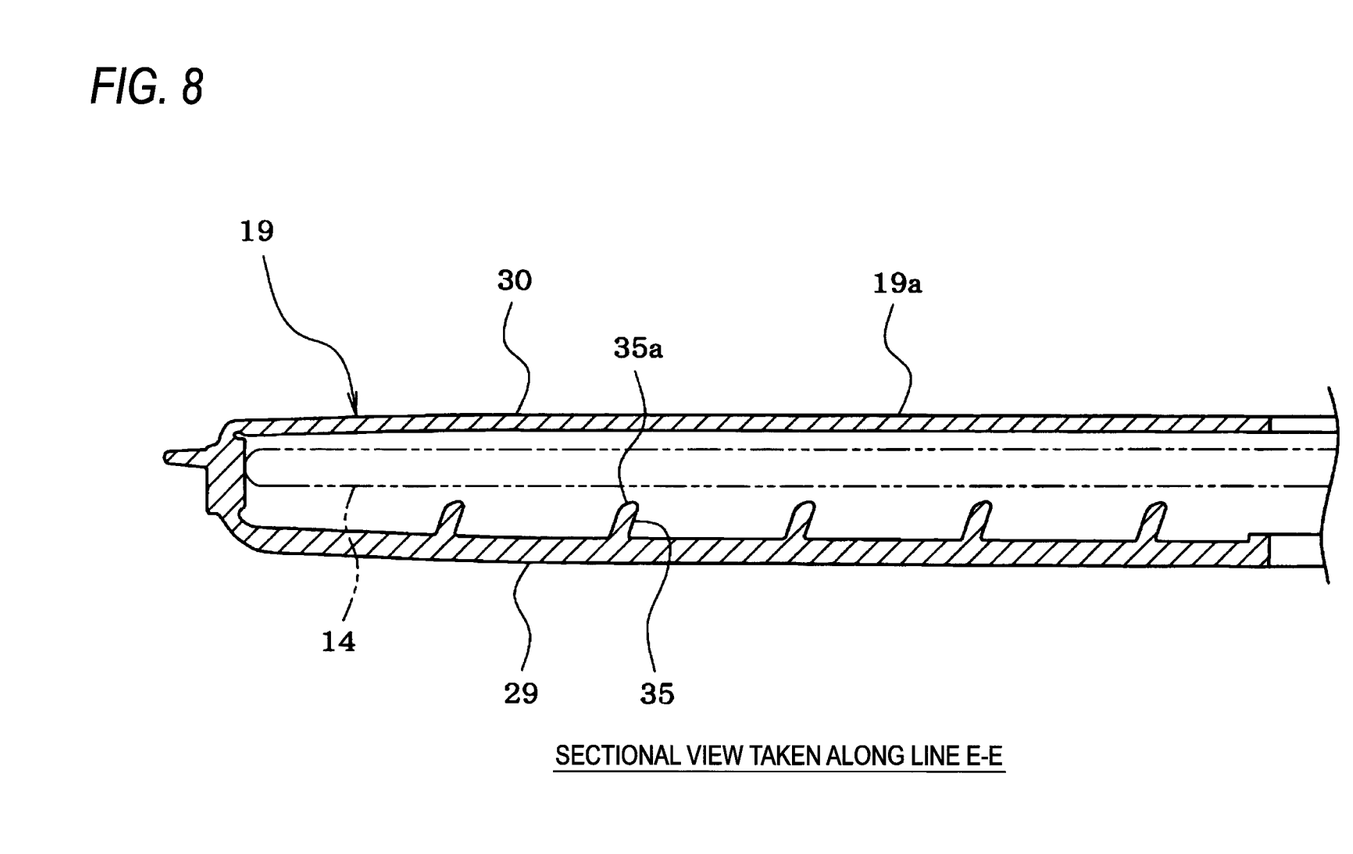
FIG. 8 is a sectional view taken along line E-E of FIG. 4.

On the other hand, as shown in FIGS. 5 to 7, the rear die-molded corner part 19 is formed in a substantially U-shape by a base bottom part 28 facing an end face of the window pane 14 and an interior side wall part 29 and an exterior side wall part 30 respectively, in a transverse cross section of the run channel 13 in a longitudinal direction thereof, erected from both ends of the base bottom part 28 in a width direction. By die molding of the elastic polymer material, the base bottom part 28, the interior and exterior side wall parts 29, 30, an interior seal lip 31 and an exterior seal lip 32 respectively extending from distal ends of the side wall parts 29, 30 toward the base bottom part 28 and the inside of the U-shape, an interior shield lip 33 and an exterior shield lip 34 respectively protruding from the distal ends of the side wall parts 29, 30 toward the sides opposite to the seal lips 31, 32, and the like, are integrally molded. The interior seal lip 31 is formed in a shape thicker than that of the exterior seal lip 32 in order to press the window pane 14 to the vehicle exterior. Here, since a main part of the front die-molded corner part 18 is substantially the same as the rear die-molded corner part 19, explanation of a configuration of the front die-molded corner part 18 is omitted.

When the run channel 13 is attached to the window frame 12, the interior seal lip 31 and the exterior seal lip 32 in each of the die-molded corner parts 18, 19 respectively abut on the surface of the window pane 14 and seal the gap between the window frame 12 and the window pane 14 to thereby prevent sound, water, etc. from leaking from the gap between the window frame 12 and the window pane 14 to the vehicle interior.

Also, the interior side wall part 29 of the rear die-molded corner part 19 is provided with a plate-shaped protrusion 35 abutting on the interior seal lip 31 at the time of upwardly and downwardly moving the window pane 14. This protrusion 35 is formed in substantially a trapezoidal plate shape (see FIG. 5), and a thickness dimension t (see FIG. 6) of the protrusion 35 is set at, for example, about 1 mm.

Figure 4:
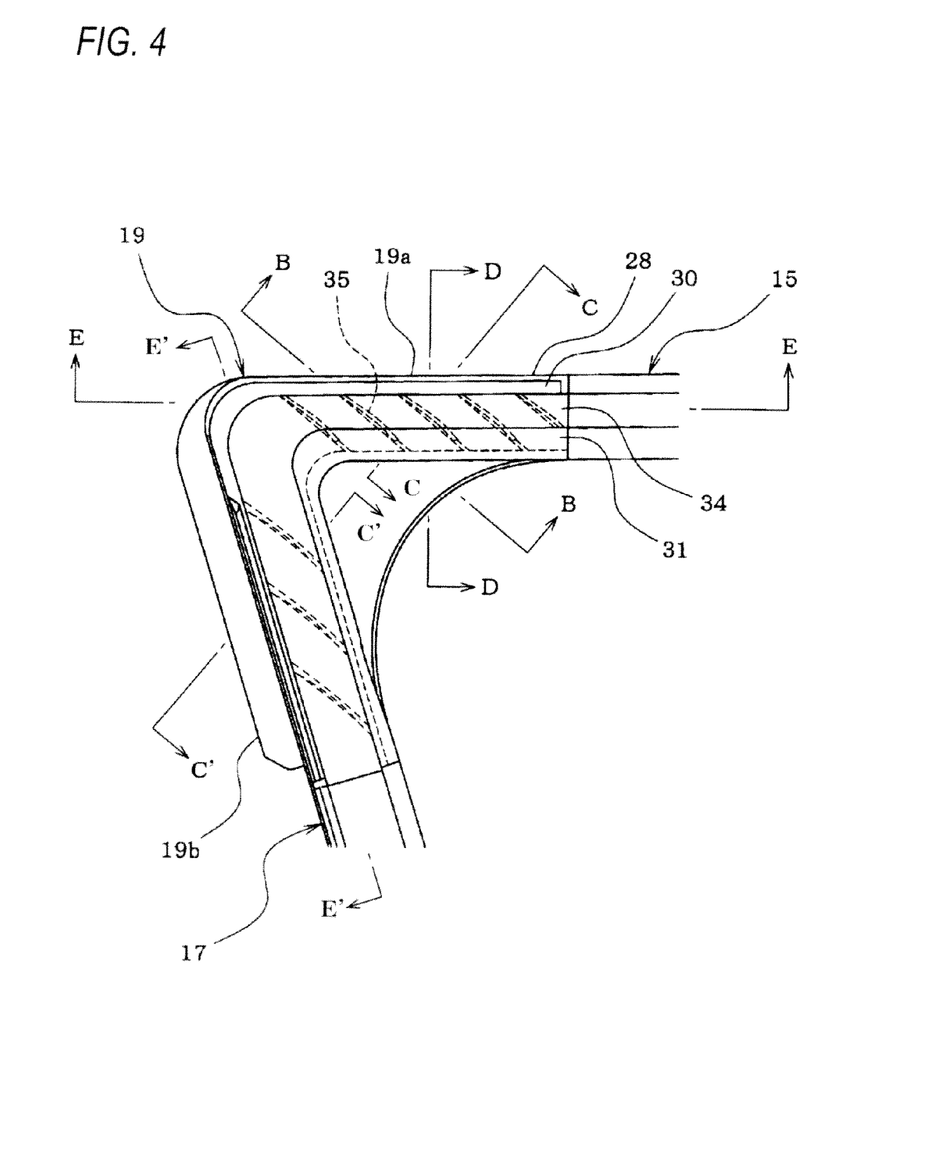
FIG. 4 is a front view of a rear die-molded corner part and its periphery.

As shown in FIGS. 4 and 5, the protrusion 35 is formed so as to extend in a direction capable of being die-molded (for example, a direction from the base end side toward the distal end side of the interior side wall part 29) along a wall surface of the interior side wall part 29. In the embodiment, a plurality of protrusions 35 are formed so as to extend from the base end side toward the distal end side of the interior side wall part 29 in an oblique direction (direction obliquely transverse to a length direction of the run channel 13). Also, in an upper part side 19a of the rear die-molded corner part 19 (portion of the rear die-molded corner part 19 attached to the upper part 12a side of the window frame 12), the protrusion 35 is formed so as to form an acute angle with respect to a direction of upward and downward movement of the window pane 14.

As shown in FIGS. 6 to 8, 10 and 11, the protrusion 35 is formed so as to obliquely protrude from the wall surface of the interior side wall part 29 toward the interior seal lip 31 to form an acute angle with respect to a wall surface of the interior side wall part 29, and is also inclined toward the base bottom part 28 side. In the embodiment, an inclination angle α (see FIG. 6) of the protrusion 35 with respect to a line perpendicular to the wall surface of the interior side wall part 29 is set to, for example, 10°. Also, the protrusion 35 is formed with a chamfered part 35a obtained by chamfering a corner of the distal end of the protrusion 35, and is configured so that the protrusion 35 can be brought into surface contact with the interior seal lip 31.

As shown in FIG. 5(a), when the window is opened (or the window pane 14 is not positioned between the seal lips 31, 32), the protrusion 35 does not abut on the interior seal lip 31, and the interior seal lip 31 is substantially parallel to an abutting surface of the protrusion 35 while maintaining a constant distance therebetween. As shown in FIG. 5(b), the window pane 14 is moved upwardly and abuts on the interior and exterior seal lips 31, 32 and finally abuts on the base bottom part 28 to thereby close the opening of the window. At that time, the interior seal lip 31 abuts on the protrusion 35 in a plane surface state after the distance between the interior seal lip 31 and the protrusion 35 becomes narrow gradually with the movement of the window pane 14.

In a state in which the interior and exterior seal lips 31, 32 abut on the surface of the window pane 14, the protrusion 35 abuts on the interior seal lip 31, and the interior seal lip 31 becomes pressed to the vehicle exterior by the protrusion 35. Accordingly, since a force by which the interior seal lip 31 presses the window pane 14 to the vehicle exterior can be increased to firmly press the window pane 14 to the exterior seal lip 32, sealability against sound or water from the vehicle exterior can be improved.

Generally, in the run channel 13, a higher waterproof performance is required at the upper extrusion-molded part 15 attached to the upper part 12a of the window frame 12 than at the front extrusion-molded part 16 attached to the front longitudinal part 12b of the window frame 12 or the rear extrusion-molded part 17 attached to the rear longitudinal part 12c. Thus, there are cases where a seal pressure of the upper extrusion-molded part 15 is set to be higher than a seal pressure of the front extrusion-molded part 16 or the rear extrusion-molded part 17. Here, the seal pressure refers to, for example, a pressure acting between the window pane 14 and the interior seal lip 31 (force by which the interior seal lip presses the window pane 14 to the vehicle exterior).

In consideration of such circumstances, in the embodiment, the protrusion 35 is formed so that a seal pressure of the upper part side 19a of the rear die-molded corner part 19 (portion of the rear die-molded corner part 19 attached to the upper part 12a side of the window frame 12) becomes higher than a seal pressure of a longitudinal part side 19b of the rear die-molded corner part 19 (portion of the rear die-molded corner part 19 attached to the longitudinal part 12c side of the window frame 12) as shown in FIG. 4.

Specifically, the upper part side 19a of the rear die-molded corner part 19 is provided with the plurality of protrusions 35, but the longitudinal part side 19b of the rear die-molded corner part 19 is not provided with the protrusion 35. That is, among the upper part side 19a and the longitudinal part side 19b of the rear die-molded corner part 19, the protrusions are provided on only the upper part side 19a. Accordingly, the seal pressure of the upper part side 19a of the rear die-molded corner part 19 can be made higher than the seal pressure of the longitudinal part side 19b of the rear die-molded corner part 19.

Also, that the seal pressure between the upper part side 19a of the rear die-molded corner part 19 and the upper extrusion-molded part 15 are made equal by providing the upper part side 19a of the rear die-molded corner part 19 with the plurality of protrusions 35. That is, in the upper extrusion-molded part 15, the seal pressure is made high by providing the distal end of the interior seal lip 23 with the return lip 27, but in the upper part side 19a of the rear die-molded corner part 19, the seal pressure is made high to the same extent as the seal pressure of the upper extrusion-molded part 15 by providing the interior side wall part 29 with the protrusions 35.

In the embodiment described above, in the rear die-molded corner part 19 of the run channel 13, the plate-shaped protrusion 35 formed on the interior side wall part 29 abuts on the interior seal lip 31, and thereby, a force by which the interior seal lip 31 presses the window pane 14 to the vehicle exterior can be increased to increase a seal pressure (pressure acting between the window pane 14 and the interior seal lip 31). As a result, the window pane 14 can be firmly pressed to the exterior seal lip 32, and sealability against sound or water from the vehicle exterior can be improved. Moreover, since the plate-shaped protrusion 35 is formed so as to obliquely protrude from the wall surface of the interior side wall part 29, when the protrusion 35 abuts on the interior seal lip 31, the protrusion 35 bends more easily, and the force by which the seal lip 32 presses the window pane 14 is prevented from becoming too strong. Thereby, the seal pressure can be increased appropriately. Further, since the protrusion 35 protrudes obliquely, the protrusion 35 can be configured to bend (lie down) always in a constant direction, and the seal pressure can be stabilized. Accordingly, in the rear die-molded corner part 19 of the run channel 13, sealability can be improved by increasing the seal pressure within a range in which the window pane 14 can move upwardly and downwardly smoothly.

Also, in the embodiment, since the protrusion 35 is inclined to the base bottom part 28 side, the protrusion 35 tends to bend to the base bottom part 28 side, which is an insertion direction of the window pane 14, and a bending direction of the protrusion 35 does not become unstable, and thus, the seal pressure is stabilized.

Further, in the embodiment, in the upper part side 19a of the rear die-molded corner part 19, since the protrusion 35 is formed so as to form an acute angle with respect to a direction of upward and downward movement of the window pane 14, the protrusion 35 lies down more easily, and the bending direction of the protrusion 35 does not become unstable, and thus, the seal pressure is stabilized.

Also, in the embodiment, in the upper extrusion-molded part 15, the seal pressure is made high by providing the distal end of the interior seal lip 23 with the return lip 27, but in the upper part side 19a of the rear die-molded corner part 19, the seal pressure is made high by providing the interior side wall part 29 with the protrusions 35. Thereby, the seal pressure becomes equal between the upper part side 19a of the rear die-molded corner part 19 and the upper extrusion-molded part 15. Accordingly, a water leak can be prevented from tending to occur in the rear die-molded corner part 19.

Also, in the run channel 13, in consideration of the fact that a high waterproof performance is required at the upper extrusion-molded part 15 attached to the upper part 12a of the window frame 12, in the embodiment, the seal pressure of the upper part side 19a of the rear die-molded corner part 19 is made higher than the seal pressure of the longitudinal part side 19b of the rear die-molded corner part 19 by providing only the upper part side 19a, among the upper part side 19a and the longitudinal part side 19b of the rear die-molded corner part 19, with the protrusions 35. Accordingly, waterproof performance of the upper part side 19a can also be enhanced in the rear die-molded corner part 19 of the run channel 13.

Further, in the embodiment, since the corner of the distal end of the protrusion 35 is chamfered, the protrusion 35 can be brought into surface contact with the interior seal lip 31, and the protrusion 35 can be prevented from bending irregularly. Accordingly, the seal pressure can be stabilized to ensure a predetermined seal pressure.

Since the present inventor et al. conducted a test using samples A to C in order to check an effect of the run channel 13 of the embodiment, its test method and test result will be described using FIG. 9.

[Test Method]

Each of the samples A to C is prepared.

The sample A is formed by cutting the upper extrusion-molded part 15 of the run channel 13 of the embodiment to a length of 100 mm. In the upper extrusion-molded part 15 of the run channel 13 of the embodiment, the distal end of the interior seal lip 23 is provided with the return lip 27.

The sample B is formed by cutting a straight portion of the rear die-molded corner part 19 (the upper part side 19a) of the run channel 13 of the embodiment to a length of 100 mm. In the rear die-molded corner part 19 of the run channel 13 of the embodiment, the interior side wall part 29 is provided with the protrusion 35.

The sample C is formed by cutting a straight portion of a rear die-molded corner part of a run channel of a comparative example to a length of 100 mm. In the rear die-molded corner part of the run channel of the comparative example, an interior side wall part is provided with a reinforcing rib with a thickness dimension of 3 mm so as to perpendicularly protrude from a wall surface of the interior side wall part. A height dimension (height dimension from the wall surface of the interior side wall part) of this reinforcing rib is set in the same as that of the protrusion 35.

A window pane position, at which a position relation between the run channel and the window pane becomes a design median value when the window is closed, is set as a reference position. For each of the samples A to C, a reaction force by which the interior seal lip presses the window pane in a direction perpendicular to the window pane when the window pane is displaced to the vehicle interior and the vehicle exterior with respect to the reference position is measured, and the reaction force is defined as a seal pressure.

[Test Result]

Figure 9:
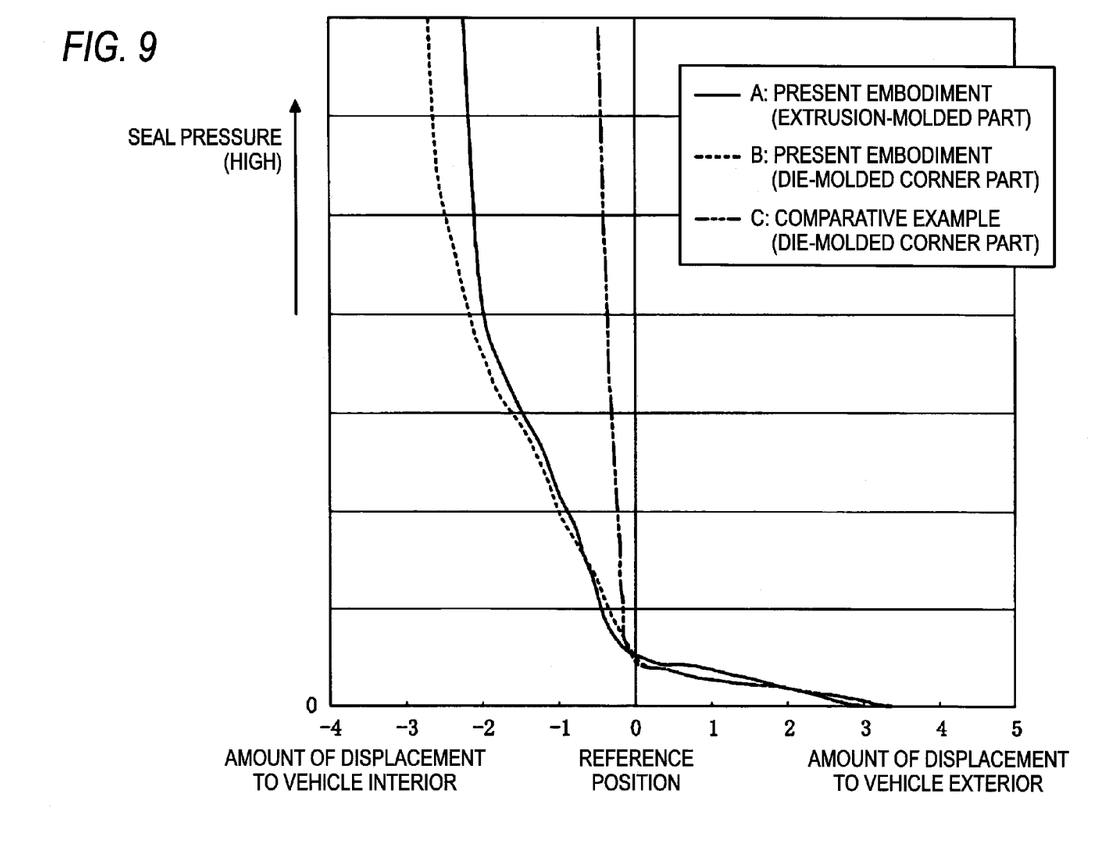
FIG. 9 is a diagram showing results of a test for checking an effect of the present embodiment.
Figure 10:
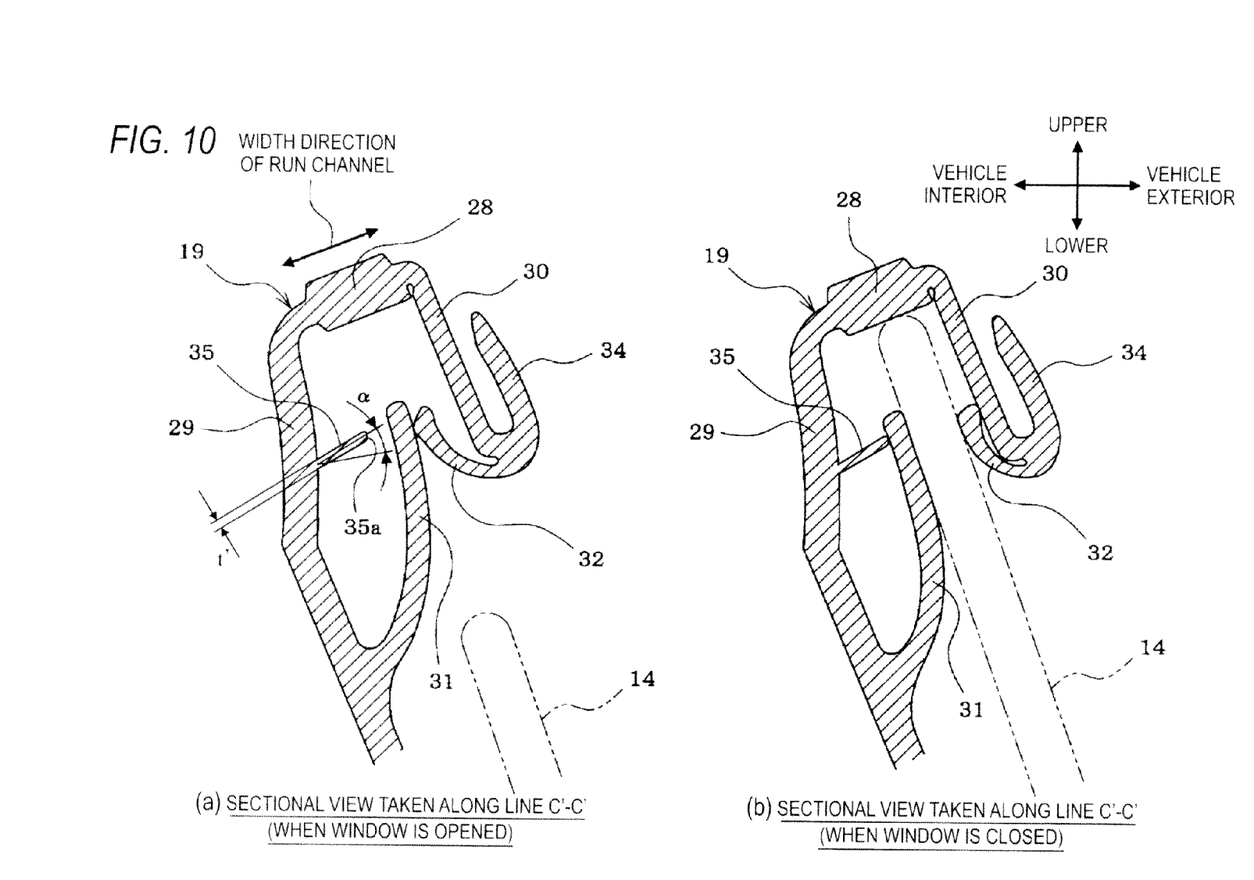
FIG. 10 is a sectional view taken along line C'-C' of FIG. 4.
Figure 11:
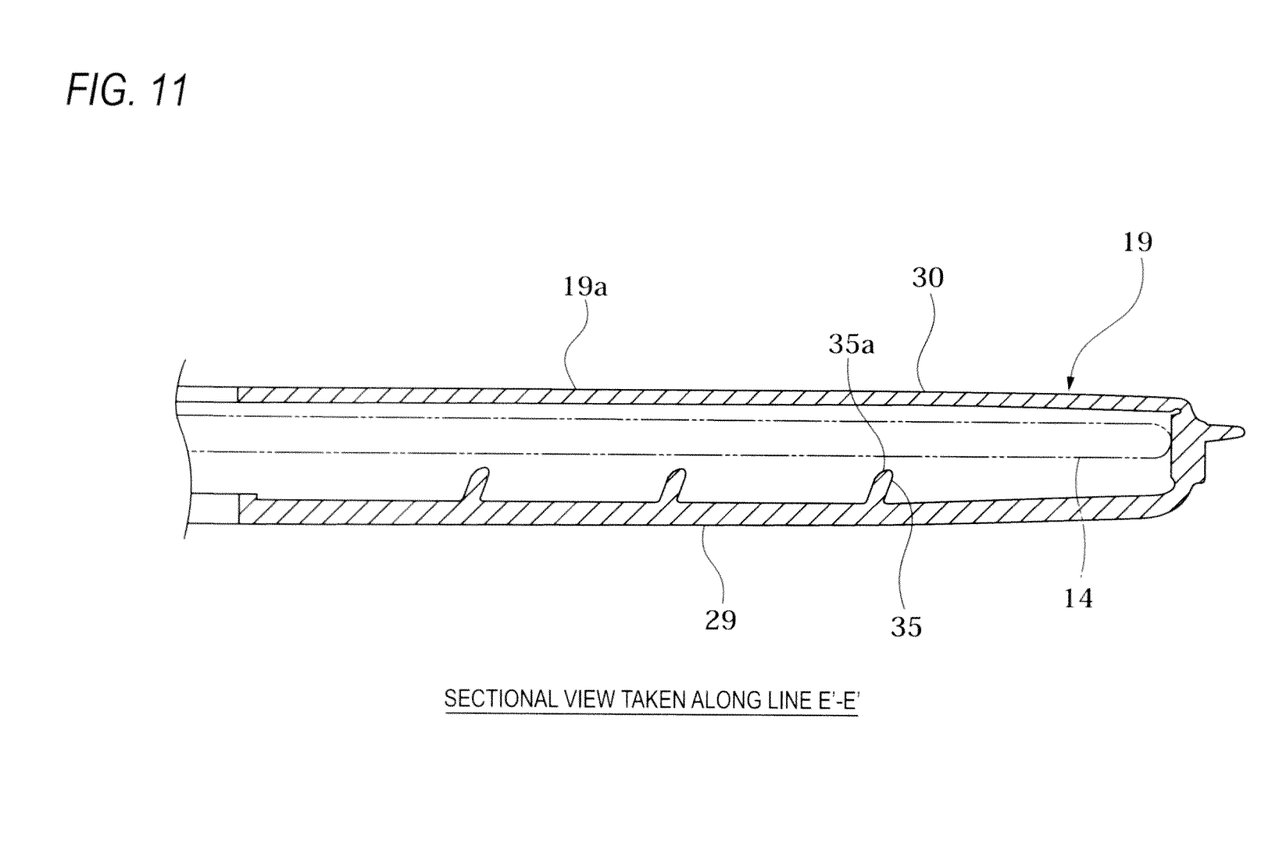
FIG. 11 is a sectional view taken along line E'-E' of FIG. 4.

According to test results shown in FIG. 9, in each of the samples A, B of the embodiment, the seal pressure is gradually increased according to the amount of displacement of the window pane when the window pane is displaced to the vehicle interior with respect to the reference position. On the other hand, in the sample C of the comparative example, the seal pressure is suddenly increased by only slight displacement of the window pane when the window pane is displaced to the vehicle interior with respect to the reference position.

Generally, the position relation between the run channel and the window pane does not necessarily become constant, and the position relation between the run channel and the window pane varies depending on, for example, an assembly error or individual differences (manufacturing variations) in the run channel, the window pane, the window frame, etc.

In the sample C of the comparative example (the interior side wall part is provided with the reinforcing rib), the seal pressure is suddenly increased by only slight displacement (for example, 0.5 mm) of the window pane to the vehicle interior with respect to the reference position due to variations in the position relation between the run channel and the window pane. Accordingly, there is a fear that the window pane cannot be moved upwardly and downwardly smoothly.

On the other hand, in the sample A of the embodiment (the distal end of the interior seal lip 23 is provided with the return lip 27) and the sample B of the embodiment (the interior side wall part 29 is provided with the protrusion 35), the seal pressure is not increased suddenly even when the window pane is displaced slightly (for example, 0.5 mm) to the vehicle interior with respect to the reference position due to variations in the position relation between the run channel and the window pane. As a result, sealability can be improved without interfering smooth upward and downward movement of the window pane.

Here, in the embodiment described above, among the upper part side 19a and the longitudinal part side 19b of the rear die-molded corner part 19, the protrusions 35 are formed on only the upper part side 19a. However, the embodiment is not limited thereto, and one or a plurality of protrusions 35 may be respectively formed on the upper part side 19a and the longitudinal part side 19b of the rear die-molded corner part 19. In this case, it is preferable to make a volume or thickness dimension of the protrusion 35 or the number of protrusions 35 formed on the upper part side 19a of the rear die-molded corner part 19 to be larger than a volume or thickness dimension of the protrusion 35 or the number of protrusions 35 formed on the longitudinal part side 19b of the rear die-molded corner part 19. Accordingly, it is possible to make the seal pressure of the upper part side 19a of the rear die-molded corner part 19 higher than the seal pressure of the longitudinal part side 19b of the rear die-molded corner part 19.

Also, the plurality of protrusions 35 may be respectively formed on the upper part side 19a and the longitudinal part side 19b of the rear die-molded corner part 19, and a distance between the plurality of protrusions 35 formed on the upper part side 19a of the rear die-molded corner part 19 may be shorter than a distance between the plurality of protrusions 35 formed on the longitudinal part side 19b of the rear die-molded corner part 19. Accordingly, it is also possible to make the seal pressure of the upper part side 19a of the rear die-molded corner part 19 higher than the seal pressure of the longitudinal part side 19b of the rear die-molded corner part 19.

Also, in the embodiment described above, the seal pressure of the upper part side 19a of the rear die-molded corner part 19 is made higher than the seal pressure of the longitudinal part side 19b of the rear die-molded corner part 19. However, the embodiment is not limited thereto, and for example, the seal pressure of the upper part side 19a of the rear die-molded corner part 19 may be made lower than the seal pressure of the longitudinal part side 19b of the rear die-molded corner part 19, or the seal pressure of the upper part side 19a of the rear die-molded corner part 19 may be made equal to the seal pressure of the longitudinal part side 19b of the rear die-molded corner part 19.

Also, in the embodiment described above, the interior side wall part 29 of the rear die-molded corner part 19 is provided with the protrusion 35. However, the embodiment is not limited thereto, and the interior side wall part 29 of the front die-molded corner part 18 may be provided with the protrusion 35.

Also, in the embodiment described above, the invention is applied to the run channel attached to the window frame of the door on the front side of the vehicle. However, the invention is not limited thereto, and may be applied to a run channel attached to a window frame of a door other than the door on the front side (for example, a door on the rear side or a back door), or a run channel attached to a window frame other than that of the door.

DESCRIPTION OF REFERENCE NUMERALS AND SIGNS

11 DOOR
12 WINDOW FRAME
13 RUN CHANNEL
14 WINDOW PANE
15~17 EXTRUSION-MOLDED PART
18,19 DIE-MOLDED CORNER PART
20 BASE BOTTOM PART
21,22 SIDE WALL PART
23,24 SEAL LIP
27 RETURN LIP
28 BASE BOTTOM PART
29,30 SIDE WALL PART
31,32 SEAL LIP
35 PROTRUSION

The invention claimed is:

1. A run channel made of an elastic polymer material, capable of being attached along a window frame of a vehicle, and guiding upward and downward movement of a window pane by being attached along the window frame, the run channel comprising: extrusion-molded parts formed by extrusion molding and attached to an upper part and a longitudinal part of the window frame; and a die-molded corner part formed by die molding and attached to a corner part of the window frame so as to connect the extrusion-molded part attached to the upper part and the extrusion-molded part attached to the longitudinal part, wherein the die-molded corner part is formed in a substantially U-shape, and includes a base bottom part having ends in a width direction, and facing an end face of the window pane when attached to the window frame, an interior side wall part, and an exterior side wall part, in a transverse cross section of the run channel in a longitudinal direction thereof, erected from the width direction ends of the base bottom part, and the die-molded corner part includes interior and exterior seal lips respectively extending from distal ends of the interior and exterior side wall parts toward the base bottom part and an inside of the U-shape, and wherein a side surface of the interior side wall part facing the interior seal lip is provided with at least one plate-shaped protrusion configured to abut on the interior seal lip, the at least one protrusion extending in a direction from a base end side toward a distal end side of the interior side wall part along the side surface of the interior side wall part and obliquely protruding from the side surface of the interior side wall part toward the interior seal lip to form an acute angle with respect to the wall surface of the interior side wall part, and wherein the at least one protrusion includes a portion closest to the interior seal lip and a portion that extends from the interior side wall part, and the portion closest to the interior seal lip is raised compared to the portion that extends from the interior side wall part, such that the at least one protrusion is inclined towards the base bottom part.

2. The run channel according to claim 1,
wherein, in an upper part of the die-molded corner part, the protrusion is formed so as to form an acute angle with respect to a direction of the upward and downward movement of the window pane.

3. The run channel according to claim 1,
wherein a pressure acting between the interior seal lip and the window pane is equal between the extrusion-molded part and the die-molded corner part connected to the extrusion-molded part.

4. The run channel according to claim 1,
wherein a pressure acting between the interior seal lip and the window pane in a portion of the die-molded corner part attached to an upper part side of the window frame, the portion being an upper part side of the die-molded corner part, is higher than a pressure acting between the interior seal lip and the window pane in a portion of the die-molded corner part attached to a longitudinal part side of the window frame, the portion being a longitudinal part side of the die-molded corner part.

5. The run channel according to claim 4, wherein the at least one protrusion includes a plurality of protrusions,
   wherein the protrusions are respectively formed on the upper part side of the die-molded corner part and the longitudinal part side of the die-molded corner part, and
   wherein a volume or thickness of the protrusion formed on the upper part side of the die-molded corner part is larger than that of the protrusion formed on the longitudinal part side of the die-molded corner part.

6. The run channel according to claim 4,
   wherein the at least one protrusion includes a plurality of protrusions, wherein the plurality of protrusions are respectively formed on the upper part side of the die-molded corner part and the longitudinal part side of the die-molded corner part, and
   wherein a distance between the plurality of protrusions formed on the upper part side of the die-molded corner part is shorter than a distance between the plurality of protrusions formed on the longitudinal part side of the die-molded corner part.

7. The run channel according to claim 4,
   wherein, among the upper part side of the die-molded corner part and the longitudinal part side of the die-molded corner part, the protrusion is formed on only the upper part side of the die-molded corner part.

8. The run channel according to claim 1,
   wherein a corner of a distal end of the protrusion is chamfered.

9. A run channel made of an elastic polymer material, capable of being attached along a window frame of a vehicle, and guiding upward and downward movement of a window pane by being attached along the window frame, the run channel comprising: extrusion-molded parts formed by extrusion molding and attached to an upper part and a longitudinal part of the window frame; and a die-molded corner part formed by die molding and attached to a corner part of the window frame so as to connect the extrusion-molded part attached to the upper part and the extrusion-molded part attached to the longitudinal part,
   wherein the die-molded corner part is formed in a substantially U-shape, and includes a base bottom part having ends in a width direction, and facing an end face of the window pane when attached to the window frame, an interior side wall part, and an exterior side wall part, in a transverse cross section of the run channel in a longitudinal direction thereof, erected from the width direction ends of the base bottom part, and the die-molded corner part includes interior and exterior seal lips respectively extending from distal ends of the interior and exterior side wall parts toward the base bottom part and an inside of the U-shape,
   wherein a side surface of the interior side wall part facing the interior seal lip is provided with at least one plate-shaped protrusion configured to abut on the interior seal lip, the at least one protrusion extending in a direction from a base end side toward a distal end side of the interior side wall part along the side surface of the interior side wall part and obliquely protruding from the side surface of the interior side wall part toward the interior seal lip to form an acute angle with respect to the wall surface of the interior side wall part,
   wherein a pressure acting between the interior seal lip and the window pane in a portion of the die-molded corner part attached to an upper part side of the window frame, the portion being an upper part side of the die-molded corner part, is higher than a pressure acting between the interior seal lip and the window pane in a portion of the die-molded corner part attached to a longitudinal part side of the window frame, the portion being a longitudinal part side of the die-molded corner part,
   wherein the at least one protrusion includes a plurality of protrusions,
   wherein the protrusions are respectively formed on the upper part side of the die-molded corner part and the longitudinal part side of the die-molded corner part, and
   wherein a volume or thickness of the protrusion formed on the upper part side of the die-molded corner part is larger than that of the protrusion formed on the longitudinal part side of the die-molded corner part.

10. The run channel according to claim 9,
    wherein a plurality of protrusions are respectively formed on the upper part side of the die-molded corner part and the longitudinal part side of the die-molded corner part, and
    wherein a distance between the plurality of protrusions formed on the upper part side of the die-molded corner part is shorter than a distance between the plurality of protrusions formed on the longitudinal part side of the die-molded corner part.

* * * * *